Oct. 25, 1960    O. K. KELLEY ET AL    2,957,370
MULTI-PHASE TORQUE CONVERTER
Filed July 11, 1957
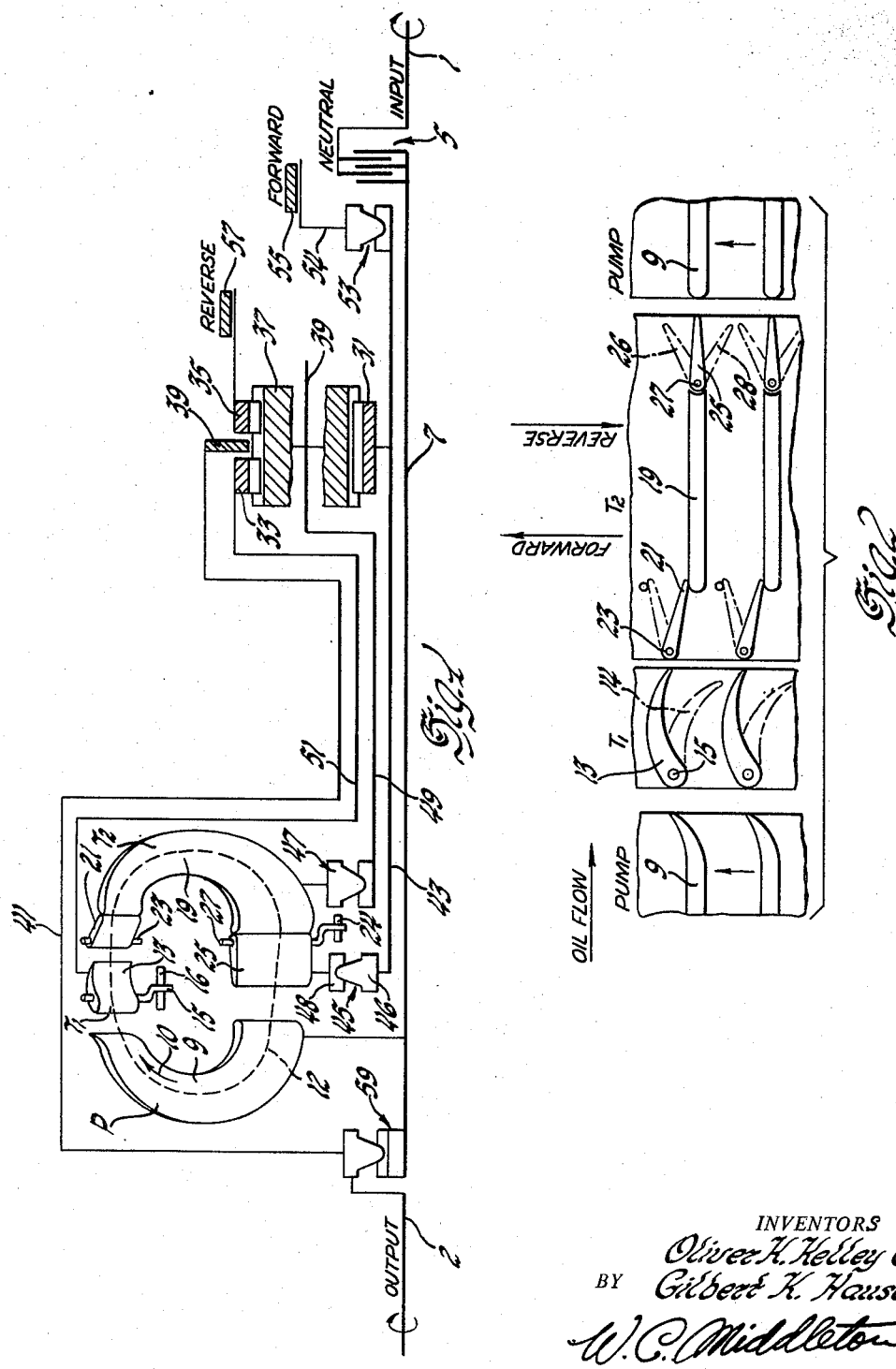
INVENTORS
Oliver K. Kelley &
BY Gilbert K. Hause
W. C. Middleton
ATTORNEY

United States Patent Office 2,957,370
Patented Oct. 25, 1960

2,957,370

MULTI-PHASE TORQUE CONVERTER

Oliver K. Kelley, Bloomfield Hills, and Gilbert K. Hause, Franklin, Mich., assignors to General Motors Corporation, Detroit, Mich., a corporation of Delaware Filed July 11, 1957, Ser. No. 671,200

12 Claims. (Cl. 75—677)

This invention relates to automatic transmissions and more particularly to automatic transmissions for vehicles and of the type employing multi-element torque converters driving through planetary gearing.

The advantages of hydrodynamic torque converters have heretofore been principally utilized to obtain smooth limited range, torque multiplication in connection with fixed ratio planetary gearing that extends the range and changes the direction of drive. The two phase hydraulic converter, that is, one with a torque converting phase and a coupling phase, provides an infinitely variable limited gear ratio range with fairly efficient fluid coupling. To improve performance a plurality of turbines connected through planetary gearing have been used to provide a wider torque ratio range through a greater speed range. Also, the use of variable angle vanes, particularly variable stators, in the torque converter has allowed limited control of the type of converter operation, that is, operation in either torque multiplication phase or coupling phase, as well as extension of usable torque multiplication over a greater speed range.

The employment of multiple element hydraulic torque converters coupled with two or more planetary gear sets has increased the operating range and improved the over all performance while maintaining the smooth transition characteristics of hydraulic torque transmitting devices. However, the addition of extra elements in the torque converter presents efficiency problems, that is where multiple turbines are utilized and where some turbines are successively relieved of their loads as other turbines take over the drive, there are losses in efficiency principally due to non-working turbines getting in the way of efficient oil flow between the working elements. By proper vane design and use of one way devices these losses can be minimized; however they are still present. Furthermore, every additional rotor with necessary vanes, thrust bearings, etc. increases the cost of manufacture as well as adds to the weight and size of the unit. Likewise the employment of additional mechanical gearing to extend the over all torque multiplication range of the hydraulic converter introduces additional efficiency losses and increases the cost, weight and size of the transmission.

The ideal transmission would be one that: (1) was as simple as possible, employing the minimum number of elements in the hydraulic torque transmitting portion and a minimum amount of gearing; (2) provided sufficient torque multiplication range for operating the vehicle including forward, reverse and braking drive; (3) provided maximum available performance under all conditions of operation at all speeds; (4) provided the proper ratio at the proper time coincident with changing engine power, torque and speed conditions, changing vehicle speed and load conditions, as well as changing operator demand; and (5) provided transition between different torque ratios, and types of vehicle drive that was smooth and unnoticeable to the vehicle occupants.

It has been found that a properly designed three element multi-phase hydraulic torque converter coupled with a single planetary gear set can reasonably satisfy all the above requirements. A torque converter that would have a wide torque multiplication range, be capable of providing usable torque multiplication over a wide range of speeds and yet have a high efficiency under these conditions is possible by proper controlled varying of the blade angles of several runner elements in the converter. By the proper use of freewheel devices in conjunction with the converter elements and gearing, both forward drive and reverse drive can be obtained from such a simple combination of elements.

It is therefore an object of this invention to provide a relatively simple transmission that has a wide range of torque multiplication, is usable over a wide range of speeds and has a relatively high efficiency.

It is a further object of the invention to provide a multiphase transmision that has high efficiency, high performance, with forward, reverse and engine braking ranges, the transmission having a hydraulic torque converter with a minimum number of elements coupled with gearing with a minimum number of elements.

It is still a further object to provide a transission wherein the vane angles are varied to provide a plurality of directions of drives, performances, and ratio ranges.

These and other objects and advantages will be apparent to one skilled in the art from the following specification and drawing which are considered part of the invention but not as limiting the same.

In general, the preferred embodiment described below and shown in the drawing includes a three element hydraulic torque converter having an impeller or pump connectable through a clutch to the engine, and two multipurpose runner members each of which at times acts as a turbine member and at other times as a reaction or stator member. The first runner has vanes that can be varied to both change the effect of oil circulated by the pump acting on the first runner and to also vary the effect of oil acting on the second runner. The second runner has a variable entrance angle portion, a fixed angle intermediate portion and a variable exit angle portion. The first runner is connected to a ring gear of a planetary gear set to either drive the same or be held by the same. The second runner is connectable to at times act as a turbine through a one way device to the carrier of the planetary gear set which in turn is connected to the transmission output shaft. The second runner is also connectable through a one way device to the sun gear of the planetary gear set to act as a reverse drive turbine and is also connectable to the transmission housing by a releasable one way device to act as a stator during low speed forward drive. A second ring gear can be held stationary by a brake to provide reaction for both the gearing and hydraulic converter for reverse. Still another one way device connects the output shaft directly with the impeller shaft for engine braking on vehicle overrun.

Referring now to the figures in which—

Fig. 1 is a schematic and diagrammatic view of the transmission; and

Fig. 2 is a diagrammatic view showing the torque converter vanes and oil flow between the vanes.

Referring to Fig. 1 which shows a schematic representation of the preferred embodiment of the invention the transmission includes an input shaft 1 adapted to be driven by suitable power source such as an automobile engine in a counterclockwise direction as viewed from the left and an output shaft 2 adapted to drive a load such as the wheels of a vehicle. Hereinafter all rotations of elements in the transmission will be as seen from the left with counterclockwise rotation representing forward rotation and clockwise rotation representing reverse rotation. A neutral clutch 5, of any suitable form and which may be placed at other locations in the drive train, connects the transmission input shaft 1 with a converter input shaft 7 which is connected to an impeller or pump wheel P represented by vane 9 having a forward bend exit portion. The impeller is adapted to circulate working fluid in the direction of the arrow 10 in a closed toroidal path whose center is represented by the dashed line 12. A first runner or turbine wheel represented in the figures and hereinafter referred to as $T_1$, carries a series of vanes 13 that are rotatable about an axis normal to the axis of the converter by means of crank pins 15 moved by any suitable control means represented in the figure by block 16. A second runner or turbine wheel represented in the figures and hereinafter referred to as $T_2$, carries a series of main vanes 19, a series of pivoted flipper entrance vane portions 21 rotatable about pivot pins 23, and a series of pivoted exit vane portions 25 rotatable by crank pins 27 adapted to be rotated by any suitable means represented by block 24.

The mechanical gearing in the transmission includes a sun gear 31, a first ring gear 33, and a second ring gear 35, each of which meshes with one or more planet pinions 37 journalled on a carrier member 39. The carrier member 39 is connected to an outer rotatable casing 41 which encloses the working fluid of the torque converter and through which carrier 39 directly drives the output shaft 2. The sun gear 31 is directly connected to an intermediate reaction and drive shaft 43 in turn connected by means of a one way device 45 to the second turbine or runner $T_2$. The one way device 45 is shown schematically in the figure to represent a ratchet or freewheel device wherein a lower portion 46 will allow the upper portion 48 connected to runner $T_2$ to freely rotate counterclockwise relative to 46 as viewed from the left. In other words the one way device 45 will allow $T_2$ to move into the plane of the paper but any motion of $T_2$ relative to element 46 in a clockwise direction as viewed from the left, that is any motion towards the viewer out of the plane of paper will be prevented. If the shaft 43 and element 46 fixed thereto are held stationary, $T_2$ will be prevented from rotating clockwise, the one way device 45 then acting as a brake. If shaft 43 is not held against rotation, $T_2$ can through elements 48 and 46 drive the shaft 43 clockwise, the one way device 45 then acting as a clutch. The second runner $T_2$ is also connected through a second one way device 47 to an intermediate shaft 49 directly connected to the planetary gear carrier 39. The one way device 47 is illustrated to represent a ratchet or freewheel device which will allow rotation of $T_2$ relative to shaft 49 in a clockwise or reverse direction but will transmit counterclockwise or forward motion of $T_2$ to shaft 49 and carrier 39.

The first runner $T_1$ is connected by means of an intermediate shaft 51 to the first ring gear 33. The sun gear intermediate shaft 43 is connected to a releasable element 54 by means of a third one way device 53. The element 54 can be held against rotation in either direction by means of a brake band 55. When member 54 is held by the brake band 55, one way device 53 will permit counterclockwise or forward rotation of the shaft 43 but will prevent clockwise or reverse rotation. The second ring gear 35 is adapted to be held by a second brake band 57.

The output shaft 2 is connected to the converter input shaft 7 by means of an additional one way device 59. The one way device 59 functions to transmit overrun motion of the output shaft 2 to the transmission input shaft 7, and through the neutral clutch 5 and input shaft 1 to the vehicle engine. The one way device 59 acts to prevent the output shaft 2 from rotating faster in a counterclockwise or forward direction than the shaft 7.

*Forward operation first phase*

Forward operation of the vehicle is obtained by engaging the neutral clutch 5 to connect input shaft 1 with the converter input shaft 7 and by applying the forward band 55 which (1) by means of one way device 53 prevents reverse rotation of sun gear 31, and (2) through the one way device 45 prevents reverse rotation of the second runner $T_2$. With the neutral clutch 5 engaged the engine drives the pump P to circulate working fluid in the direction of arrow 10 to impinge on the vanes 13 of the first runner $T_1$. Regardless of the angular position of the vanes 13 the fluid circulated by impeller I will impress a torque on the vanes 13 to move the first runner $T_1$ in a forward or counterclockwise direction. This motion is transmitted through shaft 51 to the ring gear 33. The load on the output shaft 2 connected by casing 41 to the carrier 39 initially prevents rotation of the carrier 39. Rotation of the ring gear 33 by $T_1$ in a forward direction causes counterclockwise rotation of the planet pinions 37 on the carrier 39. The rotating pinions 37 act to urge the sun gear 31 in a clockwise or reverse direction but the one way device 53 and the forward brake 55 prevents such movement. With reverse rotation of sun gear 31 prevented, forward rotation of the ring gear 33 causes the planet carrier 39 to rotate counterclockwise or forwardly at a reduced speed and increased torque and through the shell 41 drives output shaft 2 at a decreased speed and increased torque.

The oil leaving $T_1$ will act on the entrance vane portions 21 to $T_2$ to position the same automatically to reduce the shock losses due to sudden changes in oil direction on impact. The effect of fluid impact on $T_2$ will be in two small steps rather than one large step. The shock loss due to fluid acting on the vanes is a function of the square of the angle of incidence, and by making the fluid impact such that the total angle of incidence is split in two portions, the first being that of the fluid acting on the pivoted entrance portions 21 and the second being that of the fluid acting on the main $T_2$ vane portion 19. The sum of the squares of two parts is always less than the square of the sum of the parts so that the total shock loss during double small angle impacts will be less than a single large angle impact.

By varying the position of the exit vane portions 25, the exit angle of oil leaving $T_2$ can be changed. With $T_2$ stationary the actual or absolute direction of oil flow from $T_2$ will be the same as the relative direction of flow. Changing the exit angle of $T_2$ has two effects: (1) that of varying the actual reaction force and negative torque on $T_2$, the greater the exit angle the greater the total angle the oil direction has been changed by $T_2$ and hence the greater the negative force on $T_2$; and (2) that of changing the absolute direction of oil entering the pump which change acts to vary the magnitude of tangential velocity of oil leaving the pump and hence the available torque that can be impressed on $T_1$. The additional negative torque on $T_2$ due to increasing the exit angle of $T_2$ will be the same as the additional positive torque available for action on $T_1$.

During stall or initial start condition the second runner $T_2$ is held stationary because the working fluid leaving the vanes of non-moving $T_1$ has a considerable reverse or downward component as seen in Fig. 2 and thus is turned through an appreciable angle by the vanes of $T_2$ and acts on the vanes of $T_2$ to urge them reversely. However, reverse rotation of $T_2$ is prevented by the one way devices 45 and 53, and the forward brake 55. $T_2$ therefore acts as a reactor or stator member during the first phase of operation. As stated above the direction of the oil leaving the secondary turbine $T_2$ is influenced by position of the variable exit vane portions 25. With the vane portions 25 in their extreme counterclockwise position represented by the upper dotted lines 26 (Fig. 2) the fluid leaves the secondary runner $T_2$ in a direction having a substantial forward tangential velocity component which when added to the forward velocity impressed on the fluid by the impeller vanes 9 provides a total velocity that is substantially greater than the forward velocity imposed on the fluid by the vanes 9 alone. This results in a greater available oil velocity available for impressing torque on $T_1$ and provides maximum torque multiplication. The torque on $T_1$ is the arithmetic total of the positive torque impressed on the vanes by the pump P and the negative torque acting on the secondary runner $T_2$.

With the vanes 13 of the first runner $T_1$ in their extreme clockwise position, represented by the dotted lines 14 in Fig. 2, the runner $T_1$ receives maximum torque from the working oil which leaves the vanes 13 of $T_1$ in a substantially reverse or downward direction, as viewed in Fig. 2. This creates a maximum negative torque on the secondary runner $T_2$. Thus, with the first runner $T_1$ in the extreme angle position, represented by the dotted line, and the secondary runner exit vanes 25 being positioned in their extreme counterclockwise or upper position, represented by the dotted lines 26, a maximum hydro-dynamic torque multiplication in the transmission is obtained.

If the angle of $T_1$ is reduced so that vanes 13 move closer to the solid line position of Fig. 2, the torque impressed on $T_1$ is reduced and the oil entering $T_2$ has a lesser rearward or reverse component. This results in a lesser negative torque on $T_2$ and, hence, provides a lower hydro-dynamic torque multiplication in the hydraulic converter. If the angle of $T_2$ exit vanes 25 is changed from the dotted line position 26 toward the solid line position of Fig. 2, the oil leaving $T_2$ and entering the impeller will have a smaller forward tangential velocity component resulting in a net lower forward velocity of oil leaving the pump and a lower torque on $T_1$ to be transmitted through ring gear 33 to the gearing and output shaft 2. It can thus be seen that by varying the vane angles of $T_1$ and the exit vanes of $T_2$ the torque multiplication in the converter under stall or low speed conditions can be varied within a considerable range.

As the vehicle, output shaft 2, carrier 39, ring gear 33 and first runner $T_1$ picks up speed, the oil leaving $T_1$ is moving in a smaller rearward absolute tangential direction due to the increased forward velocity of vanes 13 and therefore does not urge the $T_2$ entrance vanes 21 to their extreme position shown in Fig. 2 but will act on the vanes 21 to move them to a position determined by the direction of flow of the working fluid. With the second runner $T_2$ receiving fluid in a less rearward direction, the vanes of $T_2$ will turn the oil through a smaller angle resulting in a lesser negative torque acting on $T_2$ that acts to urge it in a reverse direction. Furthermore, with an increased forward speed of the pump P the fluid entering the pump vanes from $T_2$ will be moving tangentially relatively less forwardly and, consequently, will then provide a smaller fraction of the total forward velocity of the oil available to impress forward torque on $T_1$ than during the initial or stall condition. As the first runner $T_1$ continues to rotate still faster, eventually the fluid leaving the vanes 13 of runner $T_1$ will have only axial motion with no reverse component. However, if the variable exit vanes 25 are in the position indicated by 26, even though the oil moving across the secondary runner vanes 19 is moving in an axial direction, the exit vanes 25 will turn the oil forwardly resulting in a continued small negative torque on $T_2$.

*Second phase*

At same speed, depending on the position of the exit vanes 25, the negative or reverse torque on $T_2$ will cease, and the oil entering the pump will have no forward tangential velocity. Under this condition of operation, there is no hydro-dynamic torque conversion or multiplication in the hydraulic converter and the overall torque multiplication of the transmission will be that of the mechanical gearing as determined by the number of teeth or pitch diameters of the gears.

The transmission is then in its second phase wherein the pump and $T_1$ form a coupling, and as $T_1$ rotates still faster, or if the angle of $T_1$ is reduced, the oil leaving $T_1$ will eventually have sufficient absolute forward velocity to act on $T_2$ to urge it counterclockwise or forwardly. However, so long as $T_2$ is rotating slower than shaft 49 and the carrier 39 are driven by $T_1$ driving through ring gear 33, $T_2$ will not impress torque on the gearing. The one way device 47 allowing shaft 49 and carrier 39 to rotate faster than $T_2$, or to put it another way, the one way device 47 will allow $T_2$ to rotate slower than carrier 39.

*Third phase*

When the forward rotational speed of $T_2$ increases to the point where it equals the speed of $T_1$ divided by the ratio of the planetary gearing, $T_2$ will begin to impress torque on the shaft 49 through the one way device 47 and impress forward torque on the carrier 39 and output shaft 2. The transmission will then be in its third phase or double turbine coupling phase.

As $T_1$ further increases speed, the oil from the pump passing between the vanes 13 of $T_1$ is turned less and less due to the increased tangential velocity of vanes 13 relative to the absolute tangential velocity of the oil leaving the pump. With the oil being turned through a smaller angle, less torque is impressed on $T_1$. At the same time the oil leaving the $T_1$ vanes will have a greater forward component due to the constantly increasing speed of the pump and the lesser turning of the oil by $T_1$. This greater forward tangential component will increase the magnitude of the velocity of oil leaving the pump that is available for impressing torque on the vanes of $T_2$. As the torque from $T_2$ goes directly to the output carrier 39 the torque from $T_2$ is not multiplied as is the torque from $T_1$ which is multiplied by the gearing. Therefore as the torque shifts from being 100% on $T_1$ to 100% on $T^2$ the overall torque ratio of the transmission gradually changes from the ratio of the gearing to a non-multiplied or one to one ratio.

*Fourth phase*

When $T_1$ is rotating fast enough so that oil from the pump does not have its tangential direction changed by the vanes of $T_1$ then no torque will be exerted on $T_1$ and 100% of the torque will be on $T^2$. This is the fourth phase of the transmission wherein the pump and $T_2$ act as a simple coupling driving the output shaft with no torque multiplication. When the torque on $T_1$ reaches zero there is no longer a reverse reaction force on sun gear 31 and it gradually begins to rotate forward until $T_2$ and carrier 39 have reached a speed approximately that of ring gear 33 and $T_1$, in which case the planetary gearing will be rotating almost as a single locked up unit at a speed slightly less than the pump speed. The slip or difference in speeds between the pump and $T_2$ can be minimized by proper positioning of the $T_1$ vanes and the exit vane portions 25 of $T_2$ so that maximum efficiency can be obtained in the coupling phase. $T_1$ during the fourth phase will be running free in the oil circuit and will assume a speed of rotation that will present the least resistance to oil flow through the $T_1$ vanes.

*Vane control*

As mentioned above the vanes 13 of $T_1$ and the exit vanes 25 of $T_2$ are pivotally mounted and are rotated by means 16 and 24 respectively. The specific means for moving the vanes forms no part of the present invention; however, it is contemplated that the means 16 and 24 will be controlled in accordance with same output shaft load or torque demand function. This might be represented by the position of the accelerator pedal or by engine manifold vacuum or some combination of the two. The means 16 and 24 may be multiposition, that is they might be movable between two, three or more fixed positions representing optimum blade angle positions or they might be infinitely varied between two extreme positions. One vane, for example $T_1$, might be moved to fixed positions and the other infinitely varied. In general, the control should provide the proper vane angle for optimum torque multiplication with maximum efficiency (minimum slip) under varying torque demand, relative or absolute speed and actual torque conditions.

By providing a control that senses increased torque demand such as increased throttle position or decreased engine vacuum, the transmission can be changed from the fourth coupling phase to the third, second or even first phase depending on the actual demand, the relative and absolute speeds of the converter elements, and the exact vane angles provided for maximum torque multiplication. Thus while cruising in the fourth coupling phase, if the vehicle operator should desire increased performance, his act of opening the throttle would either directly, or indirectly through a vacuum sensitive control, cause the vanes of $T_1$ or $T_2$, or both, to pivot to change to a different phase operation with increased torque multiplication. For example, by rotating $T_1$ slightly toward its dotted line position 14 of Fig. 2, the vanes 13 will again act to turn the oil thus absorbing forward torque which will be multiplied by the mechanical gearing. By changing the angle of the $T_1$ vanes and by changing the exit vanes 27 toward their dotted line position 26 of Fig. 2 the oil can be made to again impart a reverse torque on $T_2$ holding it against its one way device 45 in which case the first or hydro-dynamic torque multiplying phase will be resumed. Upon cessation of the performance demand, the vanes will be returned to their coupling positions ($T_1$ in solid line, $T_2$ in dotted line 28 of Fig. 2).

*Reverse operation*

To obtain reverse drive of the output shaft 2, the forward band 55 is released and the reverse band 57 is applied. Because the teeth of ring gear 33 are in mesh with the teeth of planet gear 37 in the same way as the teeth of ring gear 35, the relative motions between planet pinion 37 and ring gear 33 will be the same as relative motion between planet pinion 37 and ring gear 35. Therefore, if ring gear 35 is held by the reverse band 57 the ring gear 33 will be held, any turning of pinion 37 relative to gear 35 being the same to gear 33. With the ring gear 33 held the first runner $T_1$ is therefore also held. Now when the pump P rotates forward, oil is circulated in a tangentially forward direction and impinges on the vanes 13 of $T_1$. The oil is then turned in a reverse direction by the vanes and leaves $T_1$ moving in a reverse tangential direction. The reversely rotating oil then impinges on the entrance vanes 21 of $T_2$ to move them into their full line position of Fig. 2. The oil then impinges on the main vane portions 19 of $T_2$ wherein it imparts reverse torque on the $T_2$ runner and through one way device 45 rotates shaft 43 in a backward direction, one way device 53 being ineffective to prevent reverse rotation due to band 55 being released. The sun gear 31 attached to shaft 43 is then driven reversely. With ring gear 35 held against rotation by band 57, reverse rotation of sun 31 causes reduced speed-torque multiplied reverse rotation of carrier 39. Through the casing 41 output shaft 2 is driven reversely at reduced speed and increased torque. The torque ratio due to hydro-dynamic multiplication in the converter will be the arithmetic sum of the input torque plus the positive reaction torque on $T_1$ divided by the input torque. Since in reverse drive the reaction member $T_1$ of the converter and reaction ring gear 35 of the gearing cannot rotate in either direction, neither the converter or gearing can assume one to one ratios. Since all reverse driving of motor vehicles is done at low speeds and for short distances this is similar to the single ratio reverse drive in other types of vehicle transmissions.

By varying the angles of $T_1$ and the exit vanes 25 of $T_2$ the maximum torque multiplication at stall can be varied in reverse drive similarly to the changes in torque multiplication in forward drive. Thus, the greater the angle $T_1$ presents to the oil from the pump P the greater will be the reaction torque on $T_1$ and the oil will be turned in a more reverse direction, that is will have a greater backward tangential component. The more the exit vanes 25 of $T_2$ are moved toward their dotted line position 26 of Fig. 2 the greater the reverse torque there will be on $T_2$. In addition oil leaving $T_2$ will have a greater forward velocity when re-entering the pump P which, when added to the forward velocity given the oil by the pump will result in a greater velocity of oil leaving the pump to impress reverse driving torque on $T_2$.

*Coast in forward drive*

When the vehicle is coasting, i.e., when the input shaft 1 tends to rotate slower than the output shaft 2, the one way device 59 will prevent the output shaft 2 from overrunning or rotating faster than the intermediate shaft 7 and through the neutral clutch 5 prevent shaft 2 from overrunning the input shaft 1. Therefore, the overrunning device 59 assures full engine braking of the vehicle when coasting.

In reverse drive the one way device does not function since one way device 59 allows the output shaft 2 to rotate in the reverse direction at any speed relative to the intermediate shaft 7. However, in reverse when the drive to the input shaft 1 is reduced, the vehicle will act to drive the carrier 39 and through the one way device 47 drive the second runner $T_2$ reversely which in turn will act as an impeller to rotate the oil in a reverse direction to attempt to rotate the pump in a reverse direction. The pump P being connected to neutral clutch 5 will transmit the reverse torque to the engine where it is absorbed in the form of engine braking. Therefore, it will be seen that in both forward and reverse ranges there is provided an efficient coast braking means.

It will be seen that there has been provided a transmission that is relatively simple and yet capable of substantial torque multiplication over a fairly large speed range with maximum efficiency during all phases of operation. Other combinations of hydraulic elements and mechanical gearing could be utilized within the scope of the invention for different applications. For example, the overall torque range can be increased by increasing the ratio of the gearing and additional gearing could be utilized. Also the variable entrance vanes 21 could be eliminated in some applications if desired.

What is claimed is:

1. In a transmission, an input shaft and an output shaft, a hydraulic torque transmitting device including an impeller adapted to be driven by said input shaft, a first runner and a second runner, a planetary gear set including a sun gear, first and second ring gears and at least one planet pinion meshing with the sun and both ring gears and journalled on a carrier connected to said output shaft, releasable means for preventing reverse rotation of said sun gear to provide reaction for said gear set, said first runner operatively connected to said first ring gear, said second runner being connected through a one way device to said carrier, releasable means for preventing reverse rotation of said second runner, and releasable means for holding said second ring gear and through said planet pinion to hold said first ring gear and said first runner.

2. In a transmission, an input shaft, an output shaft, a hydraulic torque transmitting device including an impeller adapted to be driven in a forward direction by said input shaft, a first runner and a second runner, a planetary gear set including a sun gear, a ring gear and planet pinions journalled on a carrier and meshing with said sun and ring gears, means connecting said first runner to a first one of said gears, means including a one way device connecting said second runner to a second one of said gears for transmitting reverse rotation of said second runner to said second gear, a releasable one way device connected to said second gear for preventing reverse rotation of said second gear and said second runner, and a one way device between said second runner and said carrier for transmitting forward drive from said second runner to said carrier, said carrier being connected to said output shaft.

3. In a transmission an input shaft, an output shaft, a hydraulic torque transmitting device including an impeller adapted to be driven in a forward direction by said input shaft, a first runner and a second runner, a planetary gear set including a sun gear, a ring gear and planet pinions journalled on a carrier and meshing with said sun and ring gears, means connecting said first runner to a first one of said gears, means including a one way device connecting said second runner to a second one of said gears for transmitting reverse rotation of said second runner to said second gear, a releasable one way device connected to said second gear for preventing reverse rotation of said second gear and said second runner, a one way device between said second runner and said carrier for transmitting forward drive from said second runner to said carrier, said carrier connected to said output shaft, and releasable means for preventing rotation of said first runner and said first gear to provide torque reaction in said hydraulic torque transmitting device and said gearing.

4. In a transmission having a multi-runner hydraulic torque transmitting device operatively connected through a gearing to drive an output shaft either in a forward or a reverse direction, an impeller adapted to be driven forward, a plurality of runners at least one of which is adapted to be driven either forward or reversely by working fluid circulated by said impeller, a planetary gear set including a sun gear element, a ring gear element, a carrier element, and planet gearing in said carrier element meshing with said sun and ring gears, said one runner connected to one element of said planetary gear set through a first one way device for transmitting forward rotational drive from said one runner to said gearing and through a second one way device to a second element of said gearing to transmit reverse rotational drive from said one runner to said second element of said gearing, releasable one way means connected to said second element for preventing reverse rotation of the same and simultaneously preventing reverse rotation of said one runner, and means connecting another of said runners to a third of said elements of said gearing to transmit forward rotational drive to said gearing.

5. In a transmission having a multi-runner hydraulic torque transmitting device operatively connected through a gearing to drive an output shaft either in a forward or a reverse direction, an impeller adapted to be driven forward, a plurality of runners at least one of which is adapted to be driven either forward or reversely by working fluid circulated by said impeller, a planetary gear set, said one runner connected to a first element of said planetary gear set through a first one way device for transmitting forward rotational drive from said runner to said gearing and through a second one way device to a second element of said gearing to transmit reverse rotational drive from said runner to said gearing, and means connecting said first element to said output shaft for one to one ratio direct forward rotational drive from said one runner through said first one way device to said output shaft.

6. In a transmission having a hydraulic torque transmitting device including a first runner and a second runner adapted to drive an output shaft through gearing, the combination of a planetary gear set including a sun gear, a first and a second ring gear, and at least one planet pinion journalled on a carrier connected with said output shaft and meshing with said sun and ring gears, first shaft means adapted to receive forward drive from said first runner and connected to one of said ring gears, means for releasably holding the other of said ring gears to thereby hold said first ring gear and shaft means, means releasably connected to said sun gear for preventing reverse rotation thereof to provide gear reaction for reduction drive from said first ring gear to the output shaft, second shaft means adapted to receive forward drive from said second runner, and one way means connected to said carrier and said second shaft means for transmitting forward drive from said torque transmitting device directly to said output shaft.

7. In a transmission, a multiple element hydraulic torque converter including an impeller for circulating working fluid and a plurality of vaned runners adapted to sequentially receive driving torque from said working fluid, a plurality of power transmitting shafts connected to said runners adapted to be driven by said runners, one of said runners having vanes adapted to return working fluid directly to said impeller, the vanes of said one runner having pivoted portions on the fluid exit side movable between extreme positions for varying the direction of flow of working fluid leaving the vanes of said one runner, and means for moving said pivoted portions between said positions.

8. In a transmission, a multiple element hydraulic torque converter including an impeller for circulating working fluid and a plurality of vaned runners adapted to sequentially receive driving torque from said working fluid, a plurality of shafts connected to said runners, one of said runners adapted to return working fluid directly to said impeller, the vanes of said one runner having pivoted portions on the fluid exit side movable between extreme positions for varying the direction of flow of working fluid leaving the vanes of one runner, means for moving said pivoted portions between said positions, gearing means connected to said shafts, an output shaft connected to said gearing, and means for individually and releasably holding said shafts to provide reaction in said converter and said gearing.

9. In a transmission, a multiple element hydraulic torque converter including an impeller for circulating working fluid and a plurality of vaned runners adapted to sequentially receive driving torque from said working fluid, a plurality of driven shafts connected to said runners adapted to be driven by said runners, one of said runners adapted to return working fluid directly to said impeller, each vane of said one runner including a first pivoted portion on the fluid entrance side, a fixed intermediate portion and a second pivoted portion on the fluid exit side, said first portion movable between extreme positions for varying the direction of flow of working fluid entering the fixed vane portion of said one runner, said second portion movable between extreme positions for varying the direction of flow of working fluid leaving said one runner, an output shaft, planetary gearing having first and second gear elements each connected to one of said driven shafts, said output shaft connected to the first of said gear elements to provide direct drive between one of said driven shafts and said output shaft, releasable means for providing reaction in said gearing to provide geared drive between second of said gear elements and said output shaft.

10. In a transmission, a multiple element hydraulic torque converter including an impeller for circulating working fluid and a plurality of vaned runners adapted to sequentially receive driving torque from said working fluid, the vanes of one of said runners each having a pivoted portion on the fluid exit side movable between extreme positions for varying the effect of working fluid acting on said one runner, means for moving said pivoted portion between said positions, a driven shaft, means connected to said one runner for preventing reverse rotation of said runner when working fluid acts thereon to urge it in a reverse direction, means connected to said one runner to transmit drive to said driven shaft when the working fluid acts thereon to urge it in a forward direction, movement of said pivoted vane portion adapted to change the component of forward driving torque exerted by said working fluid.

11. In a transmission, a multiple element hydraulic torque converter including a vaned impeller for circulating working fluid, a first vaned runner adapted to receive working fluid direct from said impeller, a second vaned runner adapted to receive working fluid direct from said first runner, said impeller vanes receiving said working fluid direct from the vanes of said second runner, said first runner vanes being pivotally mounted for rotation about an axis normal to the axis of rotation of said elements, means for rotating said first runner vanes about said normal axis to change the effect of working fluid on the vanes of said first runner and to change the direction of flow of said working fluid acting on said second runner, planetary gearing including a first element connected to said first runner, one way means connecting said second runner to a second gear element of said gearing for transmitting forward drive of said second runner to said second element, one way means connecting said second runner to a third gear element of said gearing for transmitting reverse drive from said second runner to said third gear element, an output shaft, and means for directly connecting said second element to said output shaft.

12. In a multi-phase hydraulic torque transmitting device for connecting an input shaft with an output shaft, a vaned impeller adapted to be driven by said input shaft in a forward direction with a predetermined input torque for circulating working fluid in a closed circuit, a first runner adapted to receive fluid from said impeller and connected through torque multiplying gearing to said output shaft, a second runner adapted to receive fluid from said first runner, one way means for preventing reverse rotation of said second runner to provide hydro-dynamic torque multiplying reaction in said device for a first phase of operation in which said first runner drives said output shaft with hydro-dynamic torque multiplication and mechanical torque multiplication, said one way means permitting forward rotation of said second runner at relatively low speeds for a second phase of operation in which said first runner drives said output shaft through said gearing with only mechanical torque multiplication, a second one way device connecting said second runner with said output shaft for transmitting a portion of the input torque in non-torque multiplied drive in cooperation with mechanically multiplied torque drive of the remainder of said input torque from said first runner to said output shaft through said gearing for a third phase of operation, said second runner transmitting all of said input torque directly to said output shaft in a fourth phase of operation.

References Cited in the file of this patent

UNITED STATES PATENTS

| 1,298,990 | Mason | Apr. 1, 1919 |
| 2,440,825 | Jandasek | May 4, 1948 |
| 2,570,889 | Van Lammern | Oct. 9, 1951 |
| 2,695,533 | Pollard | Nov. 30, 1954 |
| 2,782,059 | Kelley | Feb. 26, 1957 |

FOREIGN PATENTS

| 463,723 | Great Britain | Apr. 1, 1937 |